United States Patent
Kelley et al.

(10) Patent No.: US 8,057,955 B2
(45) Date of Patent: Nov. 15, 2011

(54) WET-SEAL CAULK FOR CARBONATE FUEL CELL

(75) Inventors: Dana A. Kelley, New Milford, CT (US); Chao-Yi Yuh, New Milford, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1443 days.

(21) Appl. No.: 11/396,154

(22) Filed: Mar. 31, 2006

(65) Prior Publication Data

US 2007/0231663 A1 Oct. 4, 2007

(51) Int. Cl.
- H01M 2/38 (2006.01)
- H01M 2/40 (2006.01)
- H01M 8/24 (2006.01)
- H01M 2/08 (2006.01)
- H01M 2/14 (2006.01)

(52) U.S. Cl. ........ 429/509; 429/457; 429/458; 429/508; 429/510; 106/33

(58) Field of Classification Search .................... 427/35, 427/36; 277/624, 628
See application file for complete search history.

(56) References Cited

U.S. PATENT DOCUMENTS

| | | | |
|---|---|---|---|
| 4,411,968 A * | 10/1983 | Reiser et al. ................ | 429/41 |
| 4,414,294 A * | 11/1983 | Guthrie ........................ | 429/460 |
| 4,514,475 A | 4/1985 | Mientek | |
| 4,643,954 A | 2/1987 | Smith | |
| 4,761,348 A | 8/1988 | Kunz et al. | |
| 5,110,692 A * | 5/1992 | Farooque et al. ............... | 429/36 |
| 5,399,438 A | 3/1995 | Tateishi et al. | |
| 5,453,331 A | 9/1995 | Bloom et al. | |
| 5,478,663 A | 12/1995 | Cipollini et al. | |
| 5,773,161 A | 6/1998 | Farooque et al. | |
| 6,159,627 A | 12/2000 | Yuh et al. | |
| 6,372,374 B1 | 4/2002 | Li et al. | |
| 6,414,294 B1 | 7/2002 | Marshall et al. | |
| 6,492,045 B1 | 12/2002 | Blanchet et al. | |
| 6,514,636 B2 | 2/2003 | Li et al. | |
| 6,531,237 B2 | 3/2003 | Kelley et al. | |
| 6,887,611 B2 | 5/2005 | Cramer et al. | |
| 6,964,825 B2 | 11/2005 | Farooque et al. | |
| 2001/0055708 A1* | 12/2001 | Krasij et al. ..................... | 429/32 |
| 2003/0124409 A1* | 7/2003 | Cramer et al. .................. | 429/37 |
| 2004/0135324 A1 | 7/2004 | Brule et al. | |
| 2005/0170233 A1* | 8/2005 | Beatty et al. .................... | 429/35 |
| 2006/0141325 A1 | 6/2006 | Hansell et al. | |

FOREIGN PATENT DOCUMENTS

JP 05129739 A * 5/1993

OTHER PUBLICATIONS

Oxide. (n.d.). Dictionary.com Unabridged. Retrieved Jan. 7, 2010, from Dictionary.com website: http://dictionary.reference.com/browse/oxide.*

Paste. (n.d.). Dictionary.com Unabridged. Retrieved Jan. 7, 2010, from Dictionary.com website: http://dictionary.reference.com/browse/paste.*

Nishihara et al., Machine translation of JP 05129739 A, May 1993.*

* cited by examiner

*Primary Examiner* — Basia Ridley
*Assistant Examiner* — Sean P Cullen
(74) *Attorney, Agent, or Firm* — Cowan, Liebowitz & Latman, PC

(57) ABSTRACT

A caulk is provided for use in a fuel cell system having an externally manifolded fuel cell stack, forming a gas seal between a manifold gasket and the stack face. The caulk is formed of a ceramic material and a binder formed into a paste.

11 Claims, 5 Drawing Sheets

WET-SEAL CAULK FOR CARBONATE FUEL CELL

BACKGROUND OF THE INVENTION

1. Field of the Invention

This invention relates to fuel cell systems with at least one fuel cell stack and an external manifold and, in particular, to a seal for use in a fuel cell system having at least one externally manifolded fuel cell stack. More particularly, the invention comprises a caulk member between a manifold and fuel cell stack that minimizes gas leakage, maintains electrical isolation and inhibits electrolyte migration.

2. Description of the Related Art

A fuel cell is a device that directly converts chemical energy in the form of a fuel into electrical energy by way of an electrochemical reaction. In general, like a battery, a fuel cell includes a negative electrode or anode and a positive electrode or cathode separated by an electrolyte that serves to conduct electrically charged ions between them. In contrast to a battery, however, a fuel cell will continue to produce electric power as long as fuel and oxidant are supplied to the anode and cathode, respectively.

In order to produce a useful amount of power, individual fuel cells are typically arranged in stacked relationship in series with an electrically conductive separator plate between each cell. A fuel cell stack may be categorized as an internally manifolded stack or an externally manifolded stack. In an internally manifolded stack, gas passages for delivering fuel and oxidant are built into the fuel cell plates themselves. An internal manifold design requires no external manifold seal, but is expensive to manufacture.

FIG. 1 is an exploded view of an externally manifolded fuel cell stack. As shown in FIG. 1, the individual fuel cells 7 are left open on their ends and gas is delivered by way of manifolds or pans 1 sealed to the perimeter of the respective faces of the fuel cell stack 6. The manifolds provide sealed passages for delivering fuel and oxidant gases to the fuel cells 7 and preventing those gases from leaking either to the environment or to the other manifolds (not shown in FIG. 1). The manifolds must perform their functions under the conditions required for operation of the fuel cell stack and for the duration of its life.

The performance of an externally manifolded fuel cell stack depends in large part on the seal established between the manifold edge and the stack face. The typical design of a manifold seal assembly with external manifolds is shown and described in U.S. Pat. No. 4,467,018. The manifolds, which are constructed from metal, must be electrically isolated from the stack face, which is typically electrically conductive and has an electrical potential gradient along its length. Dielectric insulators, such as the dielectric frame 4 shown in FIG. 1, are used between the metallic manifold and the fuel cell stack to electrically isolate the manifold from the stack and to prevent the manifolds from shorting the stack. Dielectric insulators are typically made from brittle ceramic materials such as alumina and mica, which are rigid and may be easily damaged by thermal and mechanical stresses applied on the manifold system during fuel cell stack operation.

In order to withstand the stresses imparted on the manifold system during operation of the fuel cell stack while maintaining electrical isolation between the manifold and the stack, improvements have been made to the manifolds and to the dielectric insulators used to isolate them from the stack. For example, in the flexible manifold system described in U.S. Pat. No. 6,887,611, the manifolds conform to changes in stack shape and size. A common dielectric insulator assembly is designed as a rectangular frame with joints that allow for differential movement between the stack and manifold. Such a construction is shown and described in U.S. Pat. No. 4,414,294, which discloses a rectangular insulator frame having a plurality of segments interconnected by slidable spline joints that permit expansion or contraction with the walls of the manifold and the fuel cell stack. An alternate dielectric design is described in U.S. Pat. No. 6,531,237, which describes a manifold and manifold sealing assembly having a plurality of dielectric frame assemblies. High-density and highly polished ceramics such as those described in U.S. Pat. No. 6,514,636 are desirable for use in dielectric insulators, to provide the required voltage isolation by preventing or reducing electrolyte creep over the surface of the dielectric frame.

Manifold compression against the stack face and stack compaction during operation cause mechanical stresses which are not completely accommodated by the ceramic dielectrics and may still damage them. Accordingly, various improvements have been made to the manifold-stack seal to better accommodate thermal and mechanical stresses, as well as improve the ability of the seal to reduce gas leakage. For example, a compressible ceramic felt gasket placed between the dielectric insulators and the stack edge (e.g., gasket 5 in FIG. 1) may contain an embedded compliant member that accommodates growth of bipolar plates over time during operation of the fuel cell stack and conforms the gasket to the dielectric joints, as described in U.S. patent application Ser. No. 10/627,035 filed Jul. 25, 2003, and assigned to the same assignee hereof.

However, due to the limitations of gasket materials and the non-uniform stack edge against which the gaskets are placed, the external manifold-stack seals presently used in the art are still not completely effective in eliminating gas leakage between the external manifolds and the stack face. More particularly, as shown in FIG. 2, which is a schematic side view of a portion of a fuel cell stack, each fuel cell in the stack has a cathode and anode (both generally represented by electrode 9 in FIG. 2), and an electrically conductive separator plate 10. Various designs of separator plates have been disclosed, such as in U.S. Pat. No. 4,514,475, which teaches a separator plate that can adjust to changes in thickness of cell parts during operation of the stack; U.S. Pat. No. 5,399,438, which teaches a stainless steel member with high corrosion resistance; U.S. Pat. No. 5,773,161, which teaches an improved bipolar separator structure that assists in electrolyte management by providing trough areas for dispersal or absorption of electrolyte; and U.S. Pat. No. 6,372,374, which teaches a bipolar separator plate with two pairs of opposing pocket members that are welded to a stainless steel plate member. Each cell also includes corrugated current collectors 11, as described for example in U.S. Pat. No. 6,492,045, and an electrolyte matrix 12. The fuel cells are stacked in series with a bipolar separator plate 10 between each cell.

As known in the art, the three-dimensional S-shaped structure of the bipolar plate is formed by welding the pieces that form top and bottom troughs of the separator plate to the edges of the center plate. When the edges are welded and the separator plate is folded and bended, the welded edge has a radius, which is referred to as a weld bead 13. Thus, as can be seen in FIG. 2, although the individual fuel cells provide solid edges against which a manifold gasket may be compressed, the edges of the fuel cell stack do not provide a smooth surface. Even with improved materials and structural features to accommodate growth of bipolar plates and changes in the stack shape, gaskets presently used in the art cannot form a completely effective seal when positioned against the rough surface formed by the stacked cells.

Another limitation of the seal or gasket presently used between the dielectric insulators and the edge of the stack face is that it generally has a small pore size such that it permits electrolyte to be easily absorbed during operation of the stack, which may cause undesirable transport of electrolyte from the top or positive end of the stack to the bottom or negative end. If unchecked, such vertical electrolyte migration can deplete cells of electrolyte at the positive end of the stack and cause the fuel cells at the negative end of the stack to flood. Another type of harmful electrolyte migration that can occur is movement of electrolyte from the stack across the dielectric and to the manifold, which can short the stack. Electrolyte migration is a significant factor in reducing the efficiency and shortening the life of a fuel cell stack.

Methods and devices for reducing or mitigating electrolyte migration in fuel cell systems have been discussed in U.S. Pat. No. 4,643,954, which teaches a passageway along the height of a fuel cell stack with electrolyte-wettable wicking material at opposite ends thereof, equalizing molten electrolyte content throughout the stack; U.S. Pat. No. 4,761,348, which teaches a fuel cell stack having a combination of inactive electrolyte reservoirs at the upper and lower end portions that mitigate the ill effects of electrolyte migration, and a porous sealing member with low electrolyte retention that limits electrolyte migration; and U.S. Pat. No. 5,110,692, which teaches a manifold gasket for molten carbonate fuel cells having an elongated porous member that supports electrolyte flow and barrier means for retarding such flow, which together control electrolyte flow and reduce electrolyte migration. None of these improvements, however, also provides a more efficient gas seal between the manifold gasket and stack face.

Therefore, there is a need for a manifold-stack seal that reduces or eliminates electrolyte migration, while providing an improved gas seal and maintaining electrical isolation of the manifold from the stack.

Another consideration is that fuel cells operate at very high temperatures. For example, molten carbonate fuel cells operate at about 650° Celsius. The selection of materials to be used in any manifold-stack seal must account for this long term operating temperature and allow the components to last for the life of the fuel cell stack, which is typically several years.

Accordingly, there is also a need for a manifold-stack seal that tolerates fuel cell stack operating temperatures and can accommodate stack movement and changes in stack dimensions.

It is therefore an object of the invention to provide a fuel cell manifold-stack seal for sealing a manifold to the face of a molten carbonate fuel cell stack that provides an improved gas seal between the manifold and stack and keeps the manifold electrically isolated from the stack, and also accommodates differential movements resulting from thermal stresses and internal fuel cell compactions during operation of the fuel cell stack.

It is a further object of the invention to provide a manifold-stack sealing assembly that inhibits both electrolyte migration from the positive end of the stack to the negative end, and electrolyte migration from the stack across the dielectric to the manifold.

SUMMARY OF THE INVENTION

The above and other objectives are realized in a caulk for sealing a manifold to a fuel cell stack face, wherein the caulk is adapted to be disposed on said fuel cell stack face and wherein the caulk comprises a ceramic material and a binder formed into a paste. In certain of the forms of the invention, the ceramic material includes one of alumina, cerium oxide and zirconia and the binder is a ceramic rigidizer material formed, for example, from zirconia.

The above and other objectives are further realized in a fuel cell assembly comprising: a fuel cell stack having a stack face; a manifold abutting the stack face; a caulk applied to portions of the stack face, the caulk comprising a ceramic material and a binder formed into a paste and providing a seal between the manifold and the portions of the stack face.

BRIEF DESCRIPTION OF THE DRAWINGS

The above and other features and aspects of the present invention will become more apparent upon reading the following detailed description of an illustrative embodiment thereof, in conjunction with the accompanying drawings, in which.

DETAILED DESCRIPTION

The illustrative embodiment of the present invention describes a caulk applied to portions of a fuel cell stack face. More particularly, a ceramic paste which adheres to the metal and ceramic fuel cell components to which it is applied forms an efficient manifold-stack seal without detrimentally affecting fuel cell performance or stack life.

Figure 1:
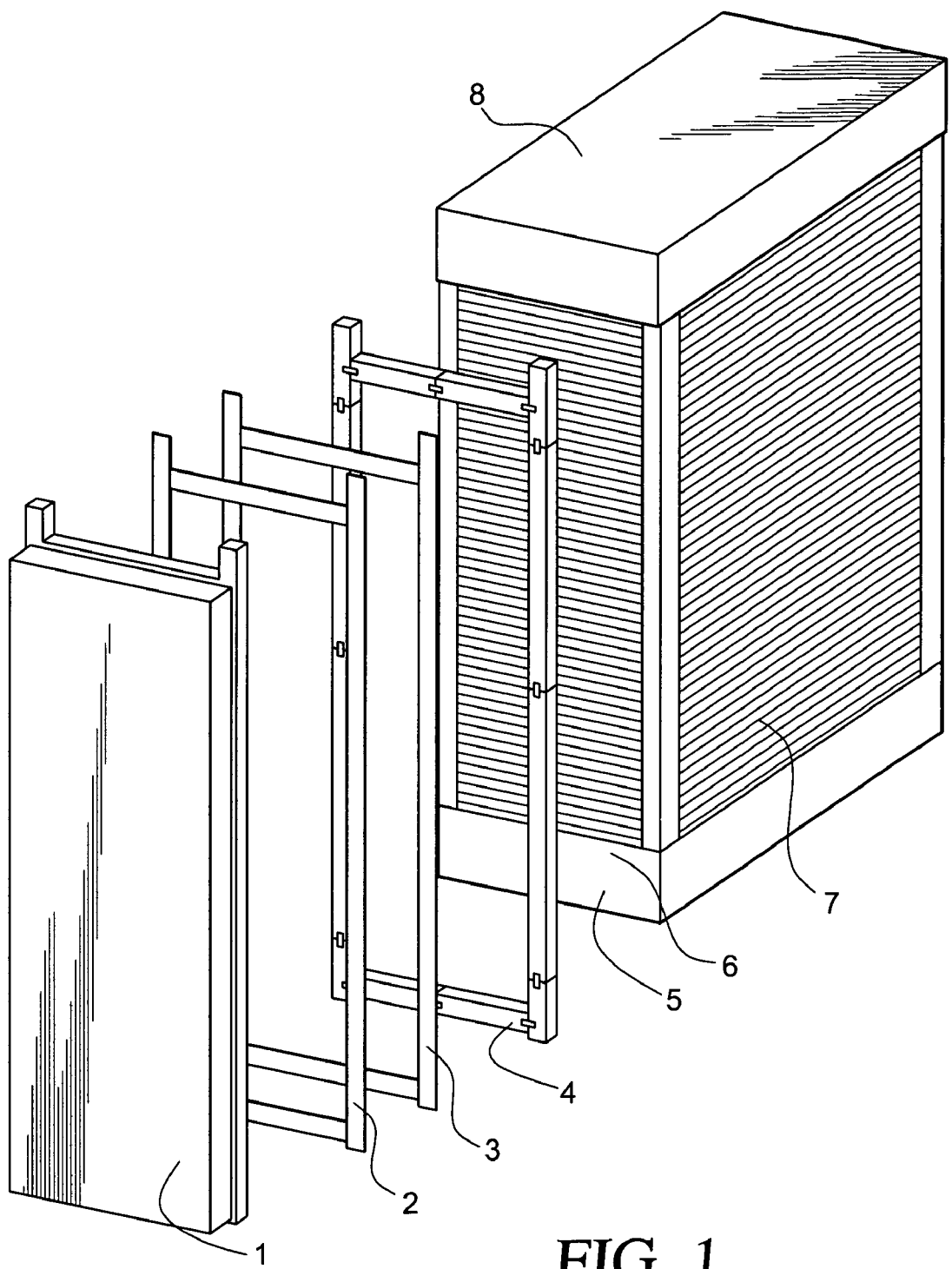
FIG. 1 is an exploded schematic view of an externally manifolded fuel cell stack at the beginning of stack life.
Figure 2:
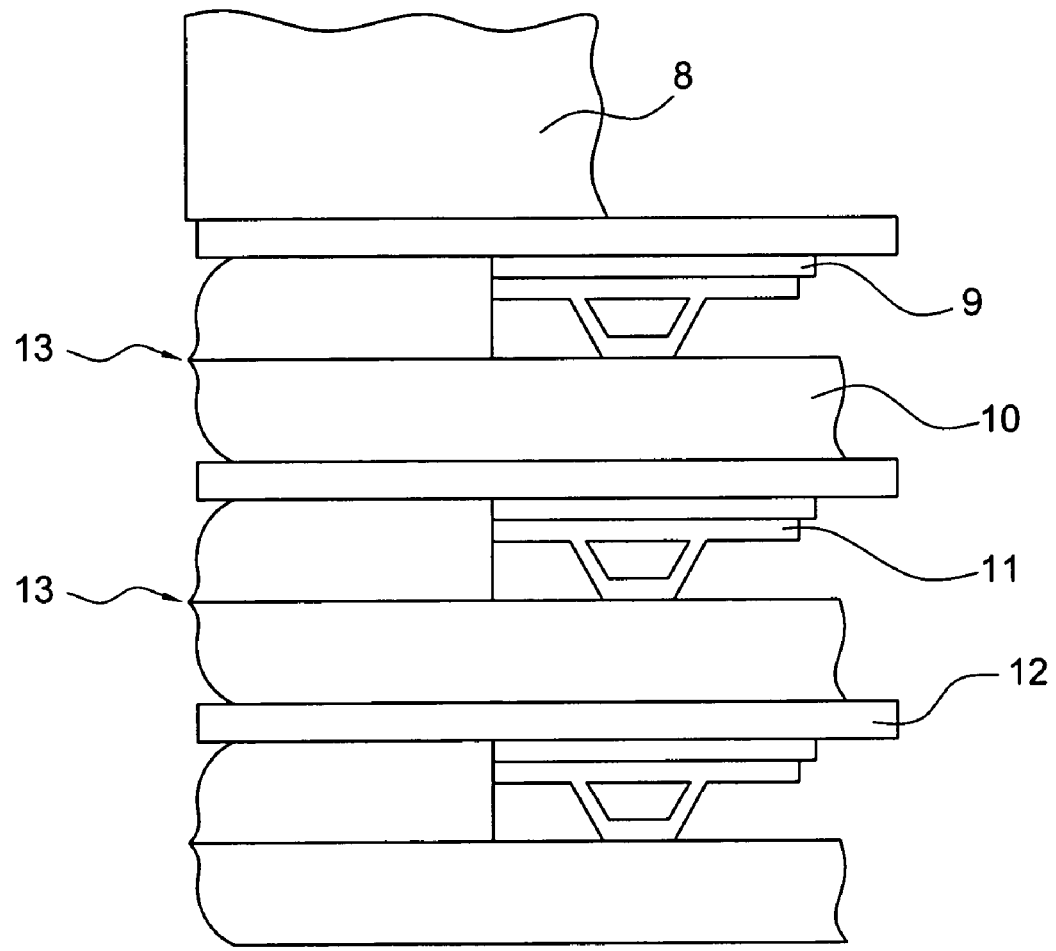
FIG. 2 is a schematic side view of a portion of a fuel cell stack, prior to application of the caulk seal.

As noted above, an important function of the seal between the manifold and stack is to reduce or eliminate gas leakage. The caulk described herein conforms to the edges and contours of the fuel cell stack face side or edge areas, as shown in FIG. 2, forming a smooth surface to which the manifold gasket can be sealed.

Figure 3:
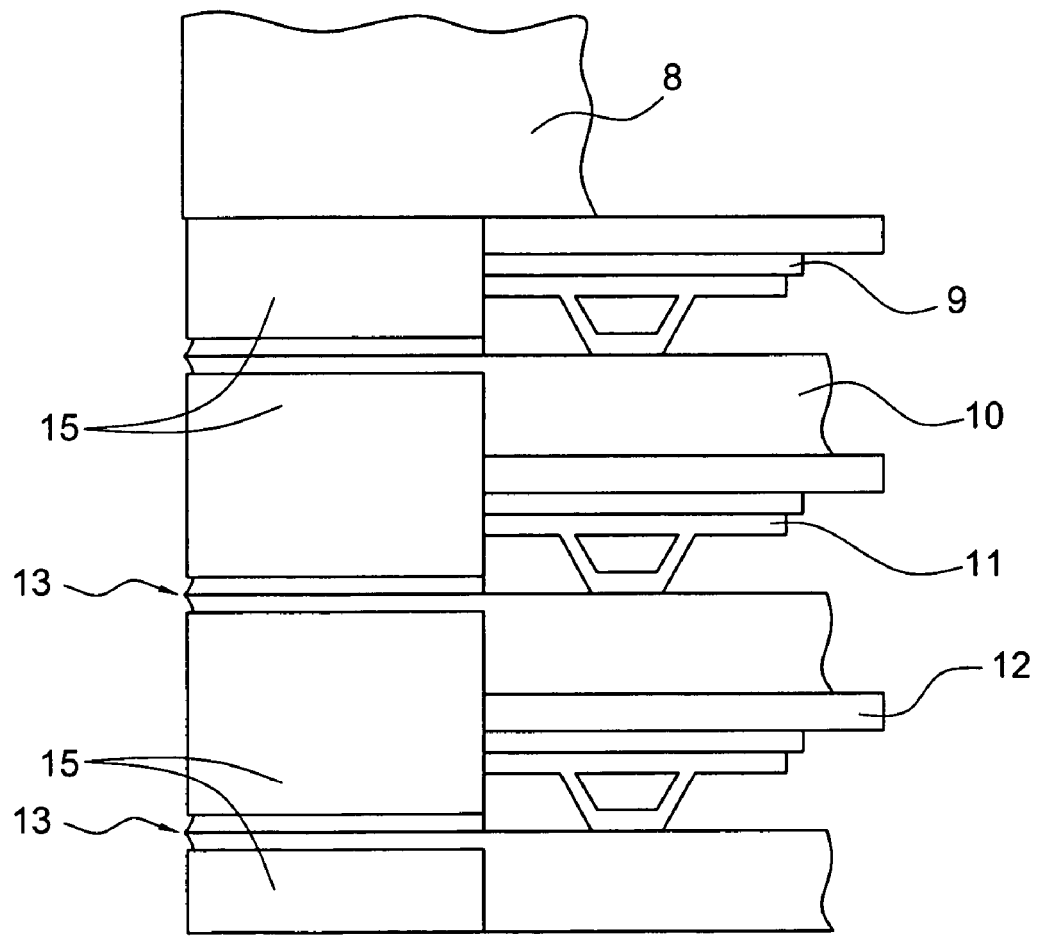
FIG. 3 is a schematic side view of the portion of the fuel cell stack shown in FIG. 2, after application of the caulk seal.

FIG. 3 is a schematic side view of the portion of a fuel cell stack face showing the smooth surface along the stack side or edge area created by the caulk 15 of the illustrative embodiment. As shown in FIG. 3, the caulk 15 is disposed on portions of the stack face side or edge area formed by the ends of the matrices 12 and the end areas of the bipolar separator plates 10. However, the caulk is applied discontinuously, so that parts of the end areas of the bipolar plates remain uncovered. In particular, the caulk is not applied over the weld beads 13 formed at the end areas, so that the surface of the stack side or edge area with the caulk member is smooth. The discontinuity of the caulk not only accounts for the protruding weld bead in providing a smooth surface on the stack face side or edge area for sealing with a manifold gasket, but also prevents electrolyte migration from the positive end of the stack to the negative end. Any electrolyte that is absorbed by the caulk 15 cannot vertically migrate farther than the end of the caulk member at each weld bead 13.

Figure 4A:
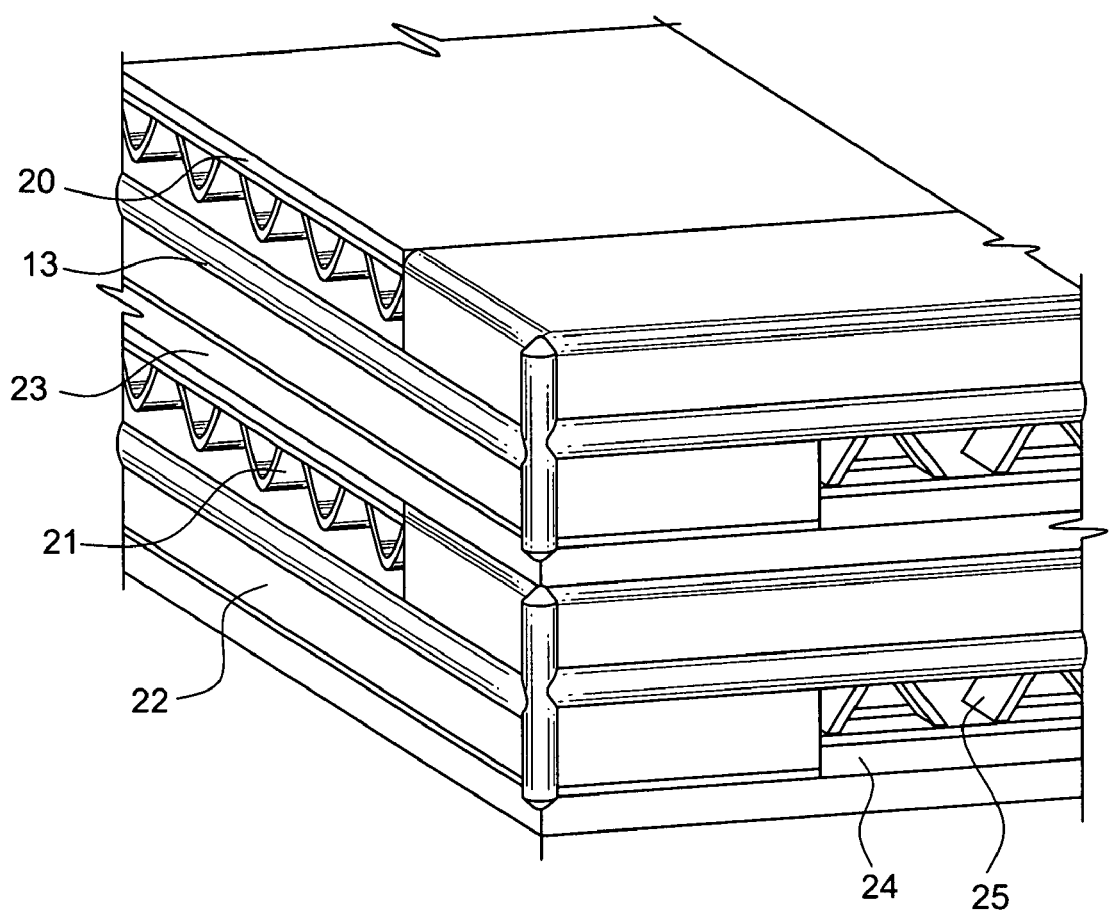
FIG. 4A is a schematic perspective view of a portion of a fuel cell stack, prior to application of the caulk seal.
Figure 4B:
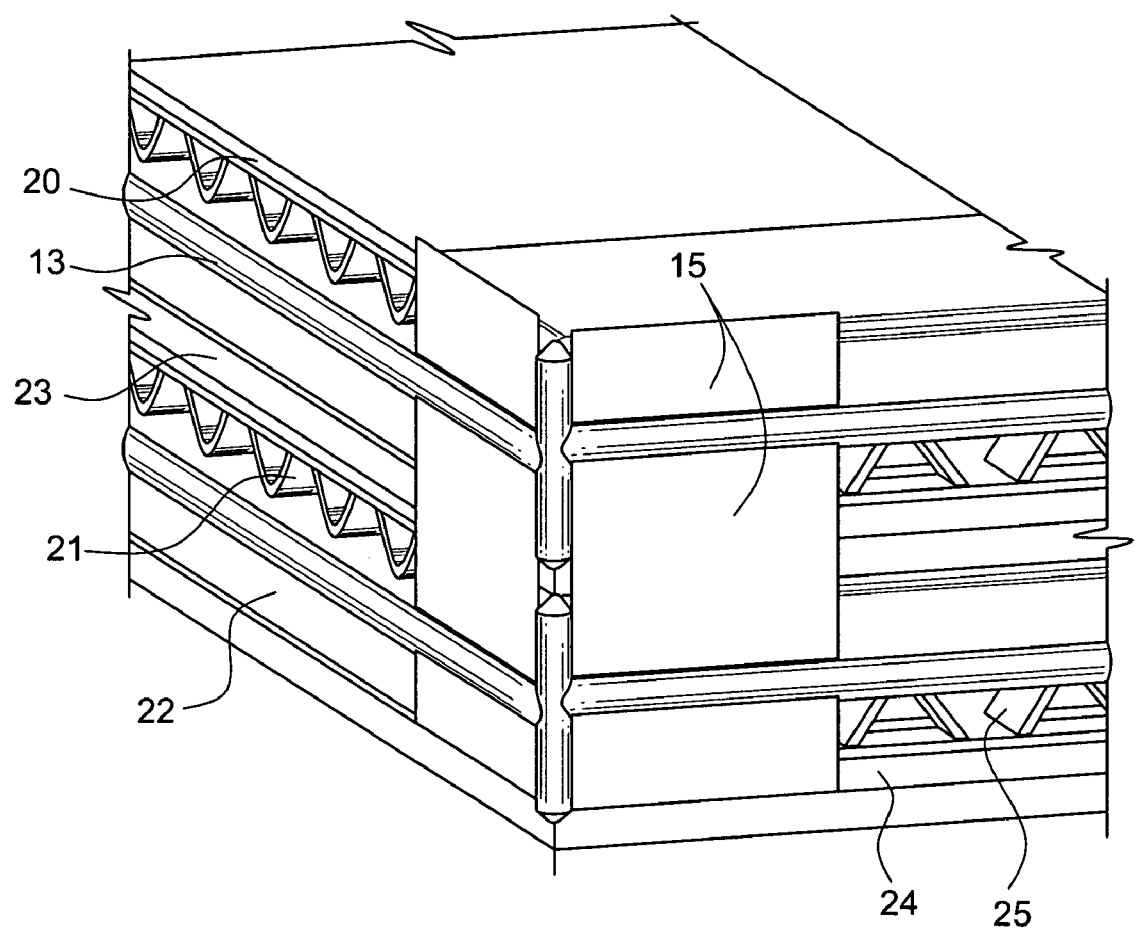
FIG. 4B is a schematic perspective view of the portion of the fuel cell stack shown in FIG. 4A, showing the caulk seal as applied to two adjacent sides of the stack.

FIGS. 4A and 4B are schematic perspective views of portions of a corner edge of a fuel cell stack. In FIG. 4A, the individual fuel cell components terminating at adjacent sides of the stack are shown. In particular, on one side, a cathode 20, corrugated cathode current collector 21, bipolar separator plate 22, and electrolyte matrix 23 are shown. It is understood in the art that portions of the cathode 20 and corrugated cathode current collector 21 are disposed within the top pocket areas formed by the bipolar plate 22, so that each component extends to approximately the width of the fuel cell stack. On an adjacent side, an anode 24, anode current collector 25 and the bipolar plate 22 and electrolyte matrix 23 are shown. The anode 24 and anode current collector 25 are understood to extend into the lower pocket areas formed by the bipolar separator plate 22. The pockets formed by the bipolar separator plate 22 are wetted by the molten carbonate electrolyte and thus form wet-seals for the carbonate fuel cells in which the bipolar separator is employed. Also shown on each of the adjacent sides of the illustrative embodiment are the weld beads 13 formed by the bipolar plate 22, which protrude from the edge of the stack face.

FIG. 4B is a schematic perspective view of the portion of the corner edge of the fuel cell stack shown in FIG. 4A, after the caulk 15 has been applied to portions of the stack face. As shown in FIG. 4B, the caulk 15 is disposed on the portions of the side or edge areas of the faces of the stack formed by the ends of the matrix 23 and the pocket or wet-seal areas formed at the end areas of the bipolar separator plate 22. As in the embodiment shown in FIG. 3, the caulk 15 is applied discontinuously, so that a part of the end area (pocket area) of the bipolar plate 22 remains uncovered. In particular, on each of the stack faces, the caulk is not applied over the weld beads 13 at the pocket areas, so that the surface of each stack face side area with the caulk is smooth. As described above with respect to FIGS. 2 and 3, the discontinuity of the caulk not only accounts for the protruding weld bead in providing a smooth surface on the stack face side or edge areas for sealing with a manifold gasket, but also prevents electrolyte migration from the positive end of the stack to the negative end, because any electrolyte that is absorbed by the caulk 15 cannot vertically migrate farther than the end of the caulk at each weld bead 13.

In a fuel cell stack in which the weld bead 13 is less pronounced, or in which no weld bead is present, the caulk 15 may be interrupted at regular intervals along the side area or edge of the stack face, leaving a small portion exposed, to achieve the same result with regard to electrolyte migration. The discontinuity of the caulk, either by not caulking over the weld bead 13 of the bipolar plate, or by interrupting the caulk at regular intervals along the length of the side area or edge of the stack face, has been shown to effectively reduce electrolyte migration by a factor of three.

Another feature of the caulk of the illustrative embodiment is that it has a large mean pore size (a mean pore size of greater than about 0.1 microns), which reduces the amount of electrolyte absorbed. The pore size distribution is a function of the materials used to form the caulk, which must be compatible with the electrolyte and with the carbonate fuel cells. Various embodiments of the caulk may be formed from powder formulations including a ceramic fiber such as alumina, cerium oxide and/or zirconia. A sample formulation used in the illustrative embodiment of the caulk is:

| Component | Purpose | Wt. % |
|---|---|---|
| Cerium Oxide bulk fiber (ground to powder) | filler | 60 |
| Zirconia bulk fiber, type ZYBF-2, No. ZPI-210 (ground to powder) | filler | 40 |
| Zirconia Rigidizer No. ZPI-202 | binder | n/a |

The caulk of the illustrative embodiment is formed by combining the powders in approximately the proportions listed above and blending them thoroughly. A binder material, such as the zirconia rigidizer listed above, is then added to the dry powder mixture until a paste is formed and is of sufficient consistency for application to the stack face side or edge area, or when the paste slightly adheres to a spatula held in a vertical position.

It is understood that various other formulations of dry powders including ceramics, such as alumina, cerium oxide and/or zirconia, may be used to form different embodiments of the caulk consistent with the principles of the present invention. It is further understood that other rigidizers including zirconia may be used to form the caulk paste, and that the rigidizer specified in the illustrative embodiment of the invention is just one example thereof.

Once the caulk is applied to the side or edge area of the stack face, it is allowed to dry so that a manifold gasket may be placed against the smooth surface formed by the caulk. The dried caulk paste has a large mean pore size which, as noted above, reduces electrolyte absorption and which, in addition to limiting vertical electrolyte migration, also reduces the horizontal electrolyte migration that has been described above as another problem with electrolyte management in the art.

The embodiment of the caulk described herein adheres to the side areas or edges of the stack face and is easy to apply, as opposed to commercially available caulks and pastes. In addition, the caulk accommodates stack shrinkage by compressing locally, at interfaces between the stack face and the manifold gasket.

In all cases it is understood that the above-described arrangements are merely illustrative of the many possible specific embodiments which represent applications of the present invention. Numerous and varied other arrangements, including use of different materials and various configurations of components of the manifold assembly and fuel cell stack, can be readily devised without departing from the spirit and scope of the invention.

What is claimed is:

1. A fuel cell assembly comprising:
   a fuel cell stack comprising a plurality of fuel cells and having a stack face;
   an external manifold separate from said fuel cell stack and abutting said stack face;
   a caulk applied to portions of said stack face and conforming to the edges and contours of the stack face so as to form a smooth surface to which a manifold gasket can be sealed, said caulk comprising a ceramic material and a binder formed into a paste and providing a seal between said external manifold and said portions of said stack face, and wherein said caulk is applied discontinuously to said portions of said stack face,
   wherein said portions of said stack face are on opposing elongated side areas of said stack face, said elongated side areas having weld beads spaced along the length of said side areas, said weld beads being devoid of said caulk.

2. A fuel cell assembly in accordance with claim 1, wherein:
   said portions of said stack face include at least an elongated side area of said stack face.

3. A fuel cell assembly in accordance with claim 1, wherein:
   said fuel cell stack includes: fuel cells each including a fuel cell matrix for carrying an electrolyte; and separator plates, each separator plate separating a fuel cell from an adjacent fuel cell and having end areas each including a weld bead and abutting respective ends of the fuel cell matrix, said end areas of each separator plate and the abutting end areas of the fuel cell matrix being at least a part of said side areas of said stack face; and said caulk extends over said end areas of said separator plates exclusive of said weld beads of said end areas and over the abutting ends of the fuel cell matrices.

4. A fuel cell assembly in accordance with claim 3, wherein:

each separator plate includes a plate member and first and second pocket members on opposite first and second sides of the plate member extending from a first surface of the plate member and third and fourth pocket members on opposite third and fourth sides of the plate member extending from a second surface opposite the first surface of the plate member;

and parts of the first and third pocket members of each separator plate define said end areas of each separator plate.

5. A fuel cell assembly in accordance with claim 1, wherein said ceramic material includes one of alumina, cerium oxide and zirconia.

6. A fuel cell assembly in accordance with claim 5, wherein said binder comprises a ceramic rigidizer material.

7. A fuel cell assembly in accordance with claim 6, wherein said ceramic rigidizer material is formed from zirconia.

8. A fuel cell assembly in accordance with claim 1, wherein said caulk member is formed by grinding at least two different ceramic fibers and mixing the resulting powders together to form a dry mixture of ceramic powders, and adding said binder to said mixture of ceramic powders to form said paste.

9. A fuel cell assembly in accordance with claim 1, wherein:

said caulk has a mean pore size greater than about 0.1 microns.

10. A fuel cell assembly comprising:

a fuel cell stack comprising a plurality of fuel cells and having a stack face;

a manifold abutting said stack face;

a caulk applied to portions of said stack face and conforming to the edges and contours of the stack face so as to form a smooth surface to which a manifold gasket can be sealed, said caulk comprising a ceramic material and a binder formed into a paste and providing a seal between said manifold and said portions of said stack face, said ceramic material comprising cerium oxide, wherein said portions of said stack face are on opposing elongated side areas of said stack face, said elongated side areas having weld beads spaced along the length of said side areas, said weld beads being devoid of said caulk.

11. A fuel cell assembly in accordance with claim 10, wherein said ceramic material further comprises zirconia.

* * * * *